(12) United States Patent
Ela

(10) Patent No.: US 11,192,278 B2
(45) Date of Patent: Dec. 7, 2021

(54) MIXTURE, A PROCESS AND A MOLD FOR MANUFACTURING RECYCLABLE AND DEGRADABLE ARTICLES

(71) Applicant: CRIATERRA INNOVATIONS LTD., Tel Aviv (IL)

(72) Inventor: Adital Ela, Tel Aviv (IL)

(73) Assignee: CRIATERRA INNOVATIONS LTD., Tel Aviv (IL)

( * ) Notice: Subject to any disclaimer, the term of this patent is extended or adjusted under 35 U.S.C. 154(b) by 612 days.

(21) Appl. No.: 15/309,661

(22) PCT Filed: May 13, 2015

(86) PCT No.: PCT/IL2015/050507
§ 371 (c)(1),
(2) Date: Nov. 8, 2016

(87) PCT Pub. No.: WO2015/173819
PCT Pub. Date: Nov. 19, 2015

(65) Prior Publication Data
US 2017/0266840 A1 Sep. 21, 2017

Related U.S. Application Data

(60) Provisional application No. 61/992,220, filed on May 13, 2014.

(51) Int. Cl.
*B28B 1/52* (2006.01)
*E04C 1/00* (2006.01)
(Continued)

(52) U.S. Cl.
CPC .............. *B28B 1/525* (2013.01); *B28B 3/025* (2013.01); *B28B 7/0002* (2013.01);
(Continued)

(58) Field of Classification Search
None
See application file for complete search history.

(56) References Cited

U.S. PATENT DOCUMENTS 1,554,358 A 9/1925 Lohmann
5,108,532 A 4/1992 Thein et al.
(Continued)

FOREIGN PATENT DOCUMENTS

AT 11416 U1 10/2010
CN 1225906 A 8/1999
(Continued)

OTHER PUBLICATIONS

Sukita Reay Crimmel, James Thomson, "Earthen Floors: A Modern Approach to an Ancient Practice", New Society Publishers, ISBN 978-0-86571-763-3, Published Mar. 2014.*
(Continued)

*Primary Examiner* — Matthew J Daniels
*Assistant Examiner* — Mohammad M Ameen
(74) *Attorney, Agent, or Firm* — Vorys, Sater, Seymour and Pease LLP; Anthony Venturino

(57) ABSTRACT

The disclosed subject matter concerns earth based mixtures, methods of preparing mixtures, and a process of forming articles of manufacture, as well as a process of manufacturing articles in molds configured for compression molding of earth based mixtures in accordance with the disclosed subject matter, including mixtures containing one or more of, e.g., sand, silt, clay, minerals, or any combination thereof.

13 Claims, 6 Drawing Sheets

(51) Int. Cl.
*C04B 28/00* (2006.01)
*B28B 3/02* (2006.01)
*B28B 7/00* (2006.01)
*B28B 11/24* (2006.01)
*C04B 18/24* (2006.01)
*C04B 103/00* (2006.01)

(52) U.S. Cl.
CPC .......... *B28B 11/243* (2013.01); *C04B 18/248* (2013.01); *C04B 28/001* (2013.01); *E04C 1/00* (2013.01); *C04B 2103/0072* (2013.01); *Y02W 30/91* (2015.05)

(56) References Cited

U.S. PATENT DOCUMENTS

| | | | |
|---|---|---|---|
| 6,335,089 | B1 | 1/2002 | Skermer et al. |
| 6,338,618 | B1* | 1/2002 | Van Ert .................. B29C 33/28 249/170 |
| 8,211,223 | B2 | 7/2012 | Brooks |
| 2001/0023559 | A1* | 9/2001 | Ozawa .................. B28B 7/364 52/100 |
| 2003/0230217 | A1 | 12/2003 | Elsaesser |
| 2005/0035478 | A1* | 2/2005 | Sewell .................. B29C 70/443 264/102 |
| 2012/0228548 | A1* | 9/2012 | Kawai .................. C04B 28/001 252/194 |
| 2013/0237633 | A1 | 9/2013 | Tamir |
| 2014/0106637 | A1* | 4/2014 | Bertucelli .................. C08J 5/24 442/136 |

FOREIGN PATENT DOCUMENTS

| | | | |
|---|---|---|---|
| CN | 101255045 | A | 9/2008 |
| CN | 102335950 | A | 2/2012 |
| CN | 103496029 | A | 1/2014 |
| DE | 29603687 | U1 | 5/1996 |
| DE | 19726439 | A1 * | 12/1998 |
| DE | 19726439 | A1 | 12/1998 |
| DE | 19735846 | A1 | 2/1999 |
| DE | 29910421 | U1 | 9/1999 |
| DE | 19825440 | A1 | 12/1999 |
| DE | 10217185 | A1 | 10/2003 |
| DE | 202004010559 | U1 | 11/2005 |
| DE | 102007018597 | A1 | 10/2008 |
| DE | 202008012158 | U1 | 2/2009 |
| DE | 202009006566 | U1 | 8/2009 |
| DE | 102012206954 | A1 | 10/2013 |
| FR | 498960 | A | 1/1920 |
| FR | 833927 | A * | 11/1938 |
| FR | 833927 | A | 11/1938 |
| FR | 994016 | A | 11/1951 |
| KR | 1020030008857 | A | 1/2003 |
| WO | 2013/041785 | A1 | 2/1999 |
| WO | 2005/089181 | A2 | 9/2005 |
| WO | 2013/155542 | A2 | 10/2013 |

OTHER PUBLICATIONS

Dr. E. A. Adam, "Compressed Stabilized Earth Block Manufacture in Sudan", Graphoprint for the United Nations Educational, Scientific and Cultural Organization, Paris, Published Jul. 2001.*
Jaquin, Paul A., et al. "Analysis of historic rammed earth construction." In Proc. 5th Int. Conf. Structural Analysis of Historical Constructions, New Delhi, India, vol. 2, pp. 1091-1098. 2006.
Ciurileanu, Gabriela-Teodora et al. "The Use of Cement Stabilized Rammed Earth for Building a Vernacular Modern House.", 2012.
Crimmel, Sukita Reay et al. Earthen Floors: A Modern Approach to an Ancient Practice, New Society Publishers, 250 pages, Apr. 21, 2014 (Apr. 21, 2014) pp. 39, 45, 56, 98.
Adam, E.A., Compressed Stabilised Earth Block Manufacture in Sudan, United Nations Educational, Scientific and Cultural Organization, Paris Jul. 1, 2001 (Jul. 1, 2001), p. 42.
CEB pressure, Open Source Ecology's wiki, http://opensourceecology.org/w/index.php?title=CEB_pressure&oldid=8206. WikiSysop, Apr. 15, 2009 (Apr. 15, 2009), "Pressures on Existing Machines".
The Liberator (CEB press), Wikipedia, https://en.wikipedia.org/w/index.php?title=The_Liberator_(CEB_press)&oldid=607695999 Jandalhandler, May 8, 2014 (May 8, 2014), Main article.
Partial supplementary European search report for corresponding EP Application No. 15792543.9, dated Jan. 3, 2018, 17 pages.
Extended European search report for corresponding EP Application No. 15792543.9, dated Apr. 6, 2018, 15 pages.

* cited by examiner

MIXTURE, A PROCESS AND A MOLD FOR MANUFACTURING RECYCLABLE AND DEGRADABLE ARTICLES

CROSS-REFERENCE TO RELATED APPLICATIONS

The present application is a U.S. National Phase of PCT/IL2015/050507 on May 13, 2015 claiming priority to U.S. provisional application No. 61/992,220 filed May 13, 2014; the disclosure of the PCT Application is hereby incorporated by reference into the present Application.

TECHNOLOGICAL FIELD

The invention is in the field of environmental friendly mixtures and methods of manufacturing articles therefrom.

BACKGROUND ART

References considered to be relevant as background to the presently disclosed subject matter are listed below:
US2013237633
WO2005089181
U.S. Pat. No. 6,335,089
CN103496029
Jaquin, Paul A., et. al. "Analysis of historic rammed earth construction." In Proc. 5th Int. Conf. Structural Analysis of Historical Constructions, New Delhi, India, vol. 2, pp. 1091-1098. 2006
Ciurileanu, Gabriela-Teodora, and Ildiko Bucur Horvath. "The Use of Cement Stabilized Rammed Earth for Building a Vernacular Modern House.", 2012

Acknowledgement of the above references herein is not to be inferred as meaning that these are in any way relevant to the patentability of the presently disclosed subject matter.

BACKGROUND

The building materials industry and the industry of interior design finishing products is controlled by conventional cement, quick lime, gypsum and burned clay. The methods of producing those materials are one of the most environmental polluting processes in the industrial world. The production of Portland cement alone is responsible for 6% of the greenhouse gas emissions currently emitted into the atmosphere. This form of pollution is caused by the firing of raw materials to create this cement, resulting in the release of carbon dioxide due to decomposition of the carbonate raw materials and due to high energy consumption needed for its production. The firing process results in the release of additional hazardous gases such as sulfides. The release of those gases to the atmosphere and the resulting effect on the ozone layer is dramatically felt and its harsh consequences can be already seen worldwide. An additional critical aspect in the concrete industry is the challenge of treating the debris of destroyed concrete/building elements after reaching their final life time, or due to early sudden destruction of the concrete/building element. Even in developed countries which recycle that debris, the amount of recycled material being reused for new construction elements is limited. The rest of the recycled/non-recycled materials are being dumped in open lands of the country, which causes a contamination of the earth and the ground water and makes these open lands unusable for any agricultural or population purpose.

Reuse of waste materials for producing new products has been suggested in various publications. For example, US2013237633 refers to a composite material comprising a first component and a second component, the first component comprising an organic element and a thermoplastic element and the second component comprising at least one element selected from the group consisting of vulcanized rubber and tire cords. This publication further discloses a process comprising mixing while heating under shear forces a first component comprising organic waste and thermoplastic waste with a second component comprising at least one element selected from the group consisting of vulcanized rubber and tire cords; to obtain a melt; processing the melt, the processing comprises at least cooling the melt to obtain a composite material comprising: organic element; thermoplastic element; and at least one element selected from the group consisting of vulcanized rubber and tire cords.

The use of mud and straw mixtures as a raw material for making bricks and for making various floor-mounted and/or wall mounted constructions is also known. Such mixtures are still in use, mostly by undeveloped populations in remote villages all over the world for the building of brick houses, dwelling huts, and internal constructions thereof such as immovable ledges and working planes embedded in the walls or planted in the ground of rural brick houses and huts. Mud bricks are commonly made by mixing earth with water, placing the mixture in molds shaped and dimensioned according to the desired bricks, dehydrating the molded mixture for initial hardening, then removing the formed bricks for final slow drying. Straw or similar natural fibers are often added to the mixture in certain amounts for improving strength and in order to avoid cracking.

The apparent trends in modern civilization, together with improved production capabilities have led to the development of some industrial yet environmental friendly products such as compressed earth block and stabilized compressed earth blocks produced by the block-ramming machine suggested by WO2005089181, fiber-clay panel as suggested by U.S. Pat. No. 6,335,089, and straw fiberboard according to CN103496029. Said U.S. Pat. No. 6,335,089 patent publication refers to a fiber-reinforced clay panel having low water permeability. The fiber-clay panel is made from a mixture of clay and primary clarifier recovered fiber, a waste material produced by pulp mills. The mixture is compressed and dried to form a panel having a rigidity similar to that of a plywood and a low coefficient of hydraulic conductivity. The panels are useful for lining and covering landfill and waste disposal sites, water-proofing basements and similar applications.

CN 103496029 is directed to material preparation process in which straw is conveyed into a vortex shredder, and is shredded into broken strips with a length of 3 cm-6 cm; the broken strips are conveyed into a hydraulic grass grinding machine, water is added, temperature rises to 180-220 DEG C., grinding and rubbing are carried out, 150-450 turns are carried out per minute, dehydration is carried out, wet-mud-shaped materials are formed, are conveyed into a fiber fluffer to be rubbed, and are conveyed into a pulp chest, recycled water is added to soak and wash the materials, and the weight ratio of the wet-mud-shaped materials and the recycled water is 1:6-8; soaking and washing are carried out three or four times, dehydration and concentration are carried out through a decker machine, impurities and thick fibers are removed through a pressurized screen, and wet straw fiber materials with a moisture content of 70-80% are obtained. According to this publication, dehydration is carried out on the wet straw fiber materials, dry straw fiber materials with a moisture content of 5-10% are obtained, mat formation is carried out on the dry straw fiber materials after sizing, and the dry straw fiber materials are manufactured into the straw fiberboard at 180-220 DEG C. in a pressing mode through a thermo compressor.

While said three latter publications refer to the use of natural resources as raw materials, most of the contemporary solutions that involve developing strong stabilized building blocks apply cement, polymers and non degradable materials. Adding these materials to a soil based mixture results in non biodegradable products with limited ecological benefits in comparison to common cement based solutions.

General Description

The disclosed subject matter concerns earth based mixtures, methods of preparing a mixture and processes of forming articles of manufacture, as well as molds for compression molding (hot press molding) of earth based mixtures in accordance with the disclosed subject matter using the process of the disclosed subject matter, including mixtures containing one or more of minerals that appear naturally having the following formation: sand, silt, clay, or any combinations thereof.

The present application provides a mixture comprising: (a) at least one natural earth material originated from insoluble earth mineral, silt and sand or any combinations thereof; (b) at least one type of clay material; (c) at least one type of plant fibers; and (d) liquid; said mixture is characterized by having a liquid content of at least about 20% wt of the total weight of the fibrous mixture.

The disclosed subject matter is directed to a mixture comprising:
(a) at least one dry natural earth material selected from insoluble earth minerals, silt and sand or any combinations thereof;
(b) at least one type of clay material;
(c) at least one type of plant fibers; and
(d) liquid;
said mixture is characterized by having a liquid content of at least about 20% wt of the weight of the fibrous mixture.

Any one or more of the following features and designs can be applied to the mixture or to any one of the other aspects subject of the present application, independently or in combination:

the liquid content is between about 20% wt to 50% wt of the weight of the fibrous mixture.

the liquid is water.

the at least one natural earth material constitutes at least 60% Vol. of the particulate mixture.

The at least one dry natural earth material constitutes between about 60% Vol. to 80% Vol. of the total volume of the particulate mixture.

The at least one clay material constitutes at least 20% Vol. of the total volume of the particulate mixture.

the at least one clay material constitutes between about 20% Vol. to 40% Vol. of the total volume of the particulate mixture.

the at least one clay material is characterized by having grain size of up to 2 microns.

the at least one clay material is characterized by having grain size of between about 0.01 to about 2 microns.

the at least one type of plant fiber constitutes at least 1% Vol. of the total volume of the fibrous mixture.

the at least one type of plant fiber constitutes between about 1% Vol. to 11% Vol. of the total volume of the fibrous mixture.

Further comprising at least one of at least one oil extracted from plants, at least one adhesive extracted from plants, at least one type of water soluble salt and any combinations thereof.

the at least one oil extracted from plants is selected from the group consisting of drying oils and any mixtures thereof.

the at least one adhesive extracted from plants is selected from the group consisted of plant extracts and any mixtures thereof such as tanin, lignin, protein and the like.

the at least one type of salt is selected from the group consisting of high water soluble salts and any mixtures thereof.

capable of being heat molded to a final article of manufacture having compressive strength of at least 8 MPa.

capable of being heat molded to a final article of manufacture having compressive strength of at least 20 MPa.

capable of being heat molded to a final article of manufacture having compressive strength of between about 10 to 30 MPa.

A mixture being fully recyclable and biodegradable.

In accordance with another aspect of the disclosed subject mater there is provided a process for preparing a product of manufacture comprising the steps of:
i) providing a mixture in accordance with the disclosed subject matter;
ii) adding said mixture to a mold;
iii) processing the mixture in said mold; the processing comprises at least one of: (a) heating the mixture to a temperature of between 60 DC to about 140 DC (b) applying predetermined compression pressure and (c) drying said mixture whereby said article of manufacture is obtained;

wherein said product is characterized by having a bending strength of between about 4 Mpa to about 7 Mpa.

In accordance with another aspect a process comprises:
subjecting at least one dry natural earth material selected from insoluble earth minerals, silt and sand or any combinations thereof; at least one type of clay material; at least one type of plant fibers to at least one processing step selected from the group consisting of mixing, drying and/or heating, to obtain a first component;

mixing the first component with a second component comprising a liquid, to obtain a mixture; and processing the mixture, the processing comprises at least one of heating the mixture to a temperature of between 60 DC to about 140 DC under compression pressures and drying the mixture whereby an article of manufacture is obtained, wherein the article of manufacture is characterized by having a bending strength between about 4 Mpa to about 7 Mpa.

In accordance with another aspect of the disclosed subject there is provided a process comprising:
providing a mixture in accordance with the disclosed subject matter; and
processing the mixture, the processing comprises at least one of heating the mixture to a temperature of between 60 DC to about 140 DC under compression pressures and drying the mixture whereby an article of manufacture is obtained,
wherein the article is characterized by having a bending strength between about 4 Mpa to about 7 Mpa.

Any one or more of the following features and designs can be applied to the processes or to any one of the other aspects subject of the present application, independently or in combination:

the compression pressure is between about 40 Bar to about 100 Bar.

the compression pressure is applied continuously or non continuously.

the compression pressure is increased and or decreased during the application of the compression pressure.

the compressive strength of the article of manufacture is at least about 8 Mpa.

the compressive strength of the article of manufacture is at least about 20 Mpa the compression pressure is applied over the mixture between about 5 min to about 30 min.

the heating time substantially corresponds to the application of the compression pressures.

the process further comprises drying the article of manufacture over a period of time at a temperature of between about 60 DC to about 100 DC.

the process further comprises drying the article of manufacture over a period of time at a temperature of about 80 DC.

the process further comprises drying the article of manufacture over at least 5 hours at a temperature of between about 60 DC to about 100 DC.

the temperature is about 80 DC.

the compression pressure applied to the mixture is between 40 Bar to about 100 Bar.

the compression pressure applied to the mixture is about 60 Bar.

In accordance with another aspect the disclosed subject matter is directed to a mold for producing an article of manufacture, comprising a fluid sealable cavity configured for receiving and holding a mixture and substantially corresponding to a shape of the article of manufacture to be molded thereby, wherein the mold comprises at least one fluid duct having an inlet port and an outlet port, wherein at least the inlet port is in fluid communication with the fluid sealable cavity and wherein at least one of the at least one fluid duct is configured for fluid extraction from the fluid sealable cavity.

In accordance with yet an aspect there is provided a mold configured for compression molding having at least a first mold part and a second mold part, the cold configured to interact so al to form a cavity substantially corresponding to the shape of the article to be molded thereby and wherein upon forming the cavity interstice is formed therebetween.

Any one or more of the following features and designs can be applied to the molds or to any one of the other aspects subject of the present application, independently or in combination:

further comprising a vacuum generator associated with the at least one fluid duct, wherein the vacuum facilitates fluid extraction from the fluid sealable cavity.

wherein the mold is configured for compression molding.

wherein the at least one fluid duct is configured for introduction of mixture into the fluid sealable cavity.

wherein the at least one fluid duct is provided with a filtering member extending along at least a portion thereof.

wherein the filtering member is configured to allow passage of particles not exceeding the size of the vapor and\or water molecules from the mixture contained within the mold cavity.

In accordance with yet another aspect of the disclosed subject matter there is provided a molding process for molding an article of manufacture, comprising:
providing a mold in accordance with the disclosed subject matter;
providing a mixture in accordance with the disclosed subject matter;
introducing the mixture to the mold;
processing the mixture within the mold, the processing comprises at least one of heating the mixture to a temperature of between 60 DC to 140 DC under compression pressure of between 40 bar to about 100 bar applied over at least a part of the mold; and
whereby producing the article of manufacture;
drying said article, whereby the article of manufacture is characterized by having a bending strength between about 4 Mpa to about 7 Mpa.

Any one or more of the following features and designs can be applied to the molding process or to any one of the other aspects subject of the present application, independently or in combination:

the process further comprises the step of applying vacuum to the mixture comprised within the mold to extract fluid therefrom.

at least a portion of the mold is preheated to a temperature of between about 60 to about 140 DC prior to introducing the mixture thereto.

the mold having a fluid sealable circumferential passageway allowing release of a fluid from the mixture prior to sealing thereof.

the step of processing the mixture is applied between at least over 5 min and up to 30 min at a predetermined temperature.

the step of drying the article is performed at about 80 DC.

the process further comprises the step of coating the article.

the vacuum is applied at predetermined intervals during the processing step.

the vacuum is applied periodically.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 1A illustrates the mold in an open configuration in a side perspective view, FIG. 1B illustrates the mold in a top view in a closed configuration; and FIG. 1C illustrates the mold in a cross section taken along A-A in FIG. 1B;

FIG. 2A illustrates the mold in an exploded perspective view, FIG. 2B illustrates the mold in a top view in a closed configuration; and FIG. 2C illustrates the mold in a cross section taken along B-B in FIG. 2B;

DETAILED DESCRIPTION OF EMBODIMENTS

Figure 1A:
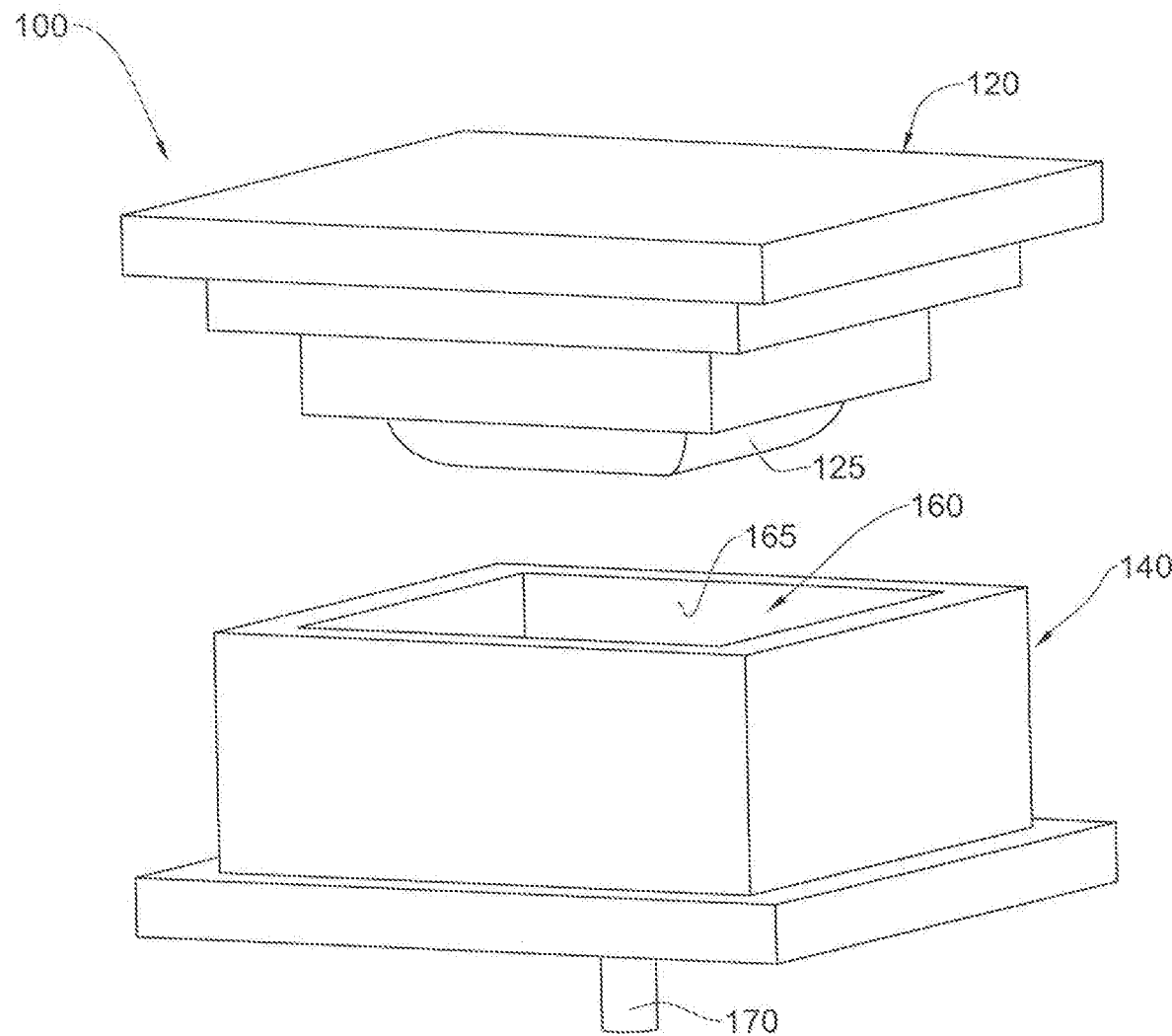
FIGS. 1A to 1C illustrate a mold in accordance with an example of the disclosed subject matter, where

The disclosed subject matter concerns earth based mixtures, methods of preparing a mixture and processes of forming articles of manufacture as well as molds for compression molding (hot press molding) of earth based mixtures, including mixtures containing one or more of minerals that appear naturally having the following formation: sand, silt, clay, or any combinations thereof.

Various terms used throughout the specification and the claims can be defined as follows:

The term "mixture" as used herein relates to a combination of at least the components (a) to (d) as described hereinabove. The mixture of the invention may be formed in any way suitable for any scale of production of said mixture.

The term "natural earth material" should be understood to encompass material originated from insoluble earth mineral, silt and sand or any combinations thereof, which are raw and/or preprocessed (e.g. grinded or particulated) naturally occurring insoluble minerals found on any geographical area on earth. This term defines naturally occurring earth materials that are other than clay material particles.

The term "particulate mixture" refers to dry particles of the mixture comprising at least one natural earth material originated from insoluble earth mineral, silt and sand or any combinations thereof and at least one type of clay material.

The term "fibrous mixture" refers to the particulate mixture combined with the plant fibers in accordance with the disclosed subject matter.

The term "total mixture" refers to the combination of the components of the mixture (a) to (d) as discussed hereinabove.

All amounts or measures indicated below with the term "about" followed by a number should be understood as signifying the indicated number with a possible tolerance between approximately 10% above the indicated number and 10% below that number. For example, the term "about 10%" should be understood as encompassing the range of 9% to 11%; the term "about 100° C." denotes a range of 90° C. to 110° C.

The singular forms "a", "an" and "the" include plural referents unless the content clearly dictates otherwise.

Throughout this specification and the Claims which follow, unless the context requires otherwise, the term "comprise", and variations such as "comprises" and "comprising", will be understood to imply the inclusion of a stated feature or component but not the exclusion of any component or feature. In this connection, the term "consisting essentially of" is used to define composite materials which include the recited feature or component but exclude any other elements that may have an essential significance on the mixture, process or the resulting article.

In some embodiments, said at least one natural earth material constitutes of at least 60% Vol. of the particulate mixture.

In other embodiments, said at least one natural earth material constitutes between about 60% Vol. to 80% Vol. of the total volume of said particulate mixture. In further embodiments, said at least one natural earth material constitutes about 60, 65, 70, 75, 80% Vol. of the total volume of said particulate mixture.

The term "clay material" as used herein should be understood to encompass fine-grained natural rock or soil material that combines one or more clay minerals (are hydrous aluminium phyllosilicates, sometimes with variable amounts of iron, magnesium, alkali metals, alkaline earths, and other cations found on or near some planetary surfaces) with traces of metal oxides and organic matter. Clay material is considered to induce an adherence between the other components contained in a mixture of the disclosed subject matter. The grain size of the clay material particles can be varied according to the predefined mechanical properties (such as the ability to withstand applied compression, tension and bending loads without failure) of the article of manufacture, In some embodiments, said at least one clay material constitutes at least 20% Vol. of the total volume of said particulate mixture.

In other embodiments, said at least one clay material constitutes between about 20% Vol. to 40% Vol. of the total volume of said particulate mixture. In yet further embodiments, said at least one clay material constitutes about 20, 25, 30, 35, 40% Vol. of the total volume of said particulate mixture.

In other embodiments, said at least one clay material is characterized by having grain size of up to 2 microns (i.e. the maximum size of the grain of clay is 2 microns). In further embodiments, said at least one clay material is characterized by having grain size of between about 0.01 to about 2 microns.

The term "plant fibers" as used herein should be understood to encompass any type of fibers derived from plants. In some embodiments, such plant fibers may be formed by processing plants to fiber forms. In other embodiments, plant fibers are being naturally extracted from plants. Non limiting examples of such plants include flax, sisal and hemp. At least one of the plant fibers have high tensile strength with a minimum of about 400 MPa. In accordance with an example of the disclosed subject matter, the length can be about 4-20 mm.

In some embodiments, said at least one type of high tensile strength plant fiber constitutes at least 1% Vol. of the total volume of the fibrous mixture.

In other embodiments, said at least one type of high tensile strength plant fiber constitutes between about 1% Vol. to 5% Vol. of the total volume of said fibrous mixture. In yet further embodiments, said at least one type of high tensile strength plant fiber constitutes about 1, 2, 3, 4, 5% Vol. of the total volume of said fibrous mixture In yet other embodiments the plant fiber constitutes at least 8% Vol. of the total fibrous mixture. In yet an embodiment the plant fiber constitutes 11% Vol.

Plant fibers provide reinforcement which can improve mechanical properties of the article of manufacture produced from the mixture in accordance with the disclosed subject matter, e.g. the bending and tension strengths of an article manufactured as disclosed herein. In some embodiments, the improvement of the bending and tension strengths of the articles manufactured can reach up to about 500% as compared to a corresponding article devoid of such fibers or any equivalents thereof.

In some embodiments, said mixture of the invention is being characterized in having a liquid content of between about 20% wt to 50% wt of the weight of the fibrous mixture (all the particles with all the fibers in a dry state). In other embodiments said mixture of the invention is being characterized in having a liquid content of about 20, 22, 24, 26, 28, 30, 32, 34, 36, 38, 40, 42, 44, 46, 48, 50% wt of the weight of the fibrous mixture.

In some embodiments, said liquid is water. In other embodiments, said liquid is plant extract adhesive or mixture thereof. In some other embodiments, a mixture of the invention further comprises at least one of: at least one plant extract oil, at least one plant extract adhesive, at least one type of soluble salt and any combinations thereof. In some embodiments the adhesives can be resins such as Copal, Rosin and the like. In other embodiments, said at least one plant extract adhesive of natural origin is selected from the group consisting of plant extracts and any mixtures. In some embodiments, plant extract adhesives are selected from tannin, lignin, protein (e. soy protein) and any mixtures thereof.

In further embodiments, said at least one type of soluble salt is selected from the group consisting of high solubility salts such as Magnesium Chloride, Calcium Chloride, NaCL and any mixtures thereof.

In some further embodiments a mixture of the invention is capable of being heat molded (i.e. molded into a final form using a mold and heated to a desired temperature and/or further applying pressure) to a final product having compressive strength of at least 8 MPa.

In some other embodiments, a mixture of the invention is capable of being heat molded to a final product having compressive strength of at least 20 MPa.

In some further embodiments a mixture of the invention is capable of being heat molded to a final product having compressive strength of between about 10 to 30 MPa. In some other embodiments a mixture of the invention is capable of being heat molded to a final product having compressive strength of about 10, 15, 20, 25, 30 MPa.

In some embodiments, a mixture of the invention is defined as being fully recyclable and biodegradable (either prior or after being molded to a final product).

The term "biodegradable" as used herein refers to the degradation (either partial or total) of a mixture of the invention (either prior to after being molded into final product) by any biotic or a-biotic means (biotic means including but not limited to bacteria, fungi or other biological means, a-biotic means including but not limited to UV exposure, atmospheric erosion or other natural atmospheric means).

In order to obtain the desired mechanical properties in the article of manufacture of the disclosed subject matter, the particle size distribution of a mixture of the disclosed subject matter should correspond to other non-natural mixtures that can provide for such mechanical properties (such as for example concrete, particle distribution of which is typically defined by A&A model and/or Fuller model which will be discussed herein below with reference to FIG. 5).

Figure 5:
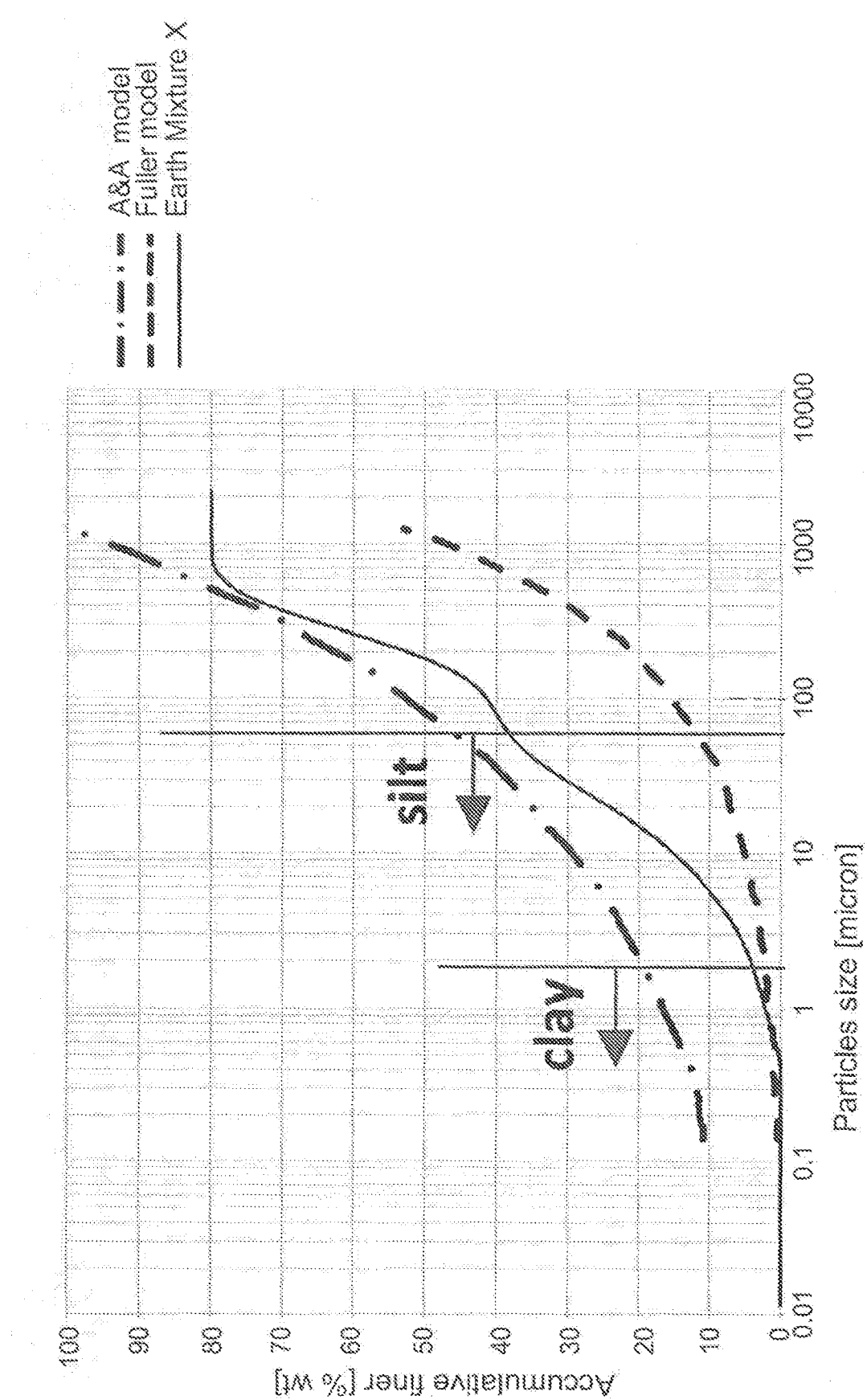
FIG. 5 illustrates a graphical presentation of particle distribution in a component of a mixture in accordance with an example of the disclosed subject matter.

FIG. 5 is a graphical presentation of the particle distribution in an example of a natural earth material, the distribution of which is represented by the solid line. The representation illustrates that a particle distribution grading line of earth mixture is poor in particles in the range of clay size particles. It will be appreciated that in this case, clay particles will be added in the amount sufficient to raise the level of said particles so as to fit the curve of the particle distribution of the desired material, e.g. concrete.

To prepare the mixture in accordance with the disclosed subject matter, a determination should be made of the dry earth material components of the mixture and their particle size distribution. Following such analysis, it can be determined which and if any additional components having specific and predefined particle size should be added. In some cases addition of clay particles may be used so as to bring the mixture to a certain predefined particle size distribution providing the mechanical properties desired for the article of manufacture. In some cases such an addition of clay material should be added in such a way that it includes both ballclay and bentonite having a ratio between the bentonite:ballclay of 1:2 up to 1:4.

Following the analysis of the dry natural earth material and the optional addition of further particles (such as clay) the mixture is further provided with reinforcement components such as plant fibers (e.g. flax, rami, hemp). The addition of the reinforcement components can be between about 1% to 6% Vol. of the fibrous mixture. In some embodiments, other fibers may be further added to the mixture, e.g. natural plant fibers with significant unique qualities such as thermal or acoustic insulation such as kenaf or date wands.

In some embodiments, 1-10% vol. of the total volume of the fibrous mixture can be natural adhesives or gluing/bonding substances such as tannin, lignin, protein can be used as part of the mixture.

In certain embodiments the mixture further comprises high soluble salts such as magnesium chloride, calcium chloride, NaCl are added to the liquid prior to its mixing with the dry components of the mixture.

In the context of the presently disclosed mixture, the term "particles size distribution" refers to the relative fractions in the mixture of particles of several given size ranges. For example, said portion of earth types from different origins may comprise about 50% large particles of a size range between 63 $\mu$m and 630 $\mu$m, 44.5% medium size particles of a size range between 2 $\mu$m and 63 $\mu$m, and 5.5% small sized particles in the size range between 0.02 $\mu$m and 2.00 $\mu$m.

Optimizing the particles size distribution is directed towards increasing the strength of the final product and its ability to withstand applied compression, tension and bending forces. It should be noted that if the particles size distribution is not properly planned or not adequately considered when creating the earth mixture, the final product will very likely comprise air cavities between the earth particles. This will result in a serious decrease in the material strength and load bearing properties of the final article. It is therefore recommended that the free hollows between particles of relatively large size range will be occupied by an appropriate fraction of relatively medium size range particles. Then, fine particles of a relatively small range size will fill up the smallest hollows remaining between the particle of the large and medium size ranges, and a clay content within (or constituting) the small range size particles will provide for bonding together the whole mixture's particles into one dehydrated and compacted piece. Such dehydration and compaction can be achieved either under the pressure and heat provided to it through the mold during the presently disclosed molding process, or by any production process during which the mixture was compressed and dehydrated to a degree similar to what is suggested in the description of presently disclosed molding process.

In case the particles size distribution in a natural earth mixture does not satisfy the strength requirements of an intended product the natural internal bonding qualities in such mixture can be enhanced and/or optimized by supplementing the mixture with fine clays such as bentonite and ballclay.

In various embodiments of the presently disclosed mixture the plant fibers are cut to a predetermined length between 2 mm to 20 mm, in some embodiments in the range of 6-14 mm. Fibers appropriate for a variety of applications may be extracted according to local availability and design considerations from e.g. Flax, palm frond bases, wheat, bamboo, coconut, hemp, date waste, wheat straw, Kenaf (Hibiscus cannabinus) fibers, wickers, sisal or other fibers with similar characteristics.

Such reinforcement will allow for minimizing the thickness of the product towards e.g. 3-4 mm for articles such as light shades and e.g. 10 mm for wall tiles.

TABLE 1

EARTH BASED MIXTURE - Material Composition

| Material | Description | Percentage of mixture in weight/volume |
| --- | --- | --- |
| Dry natural earth material | One or more types of natural earth material or mixtures of one or more of the following: sand, silt, loam, soil, minerals that appear naturally in such mixtures in any combination. | 60-80% Vol. |
| Clay material | Fine clay with strong cohesive properties such as bentonite and\or ballclay. | Total of 20-40% Vol. clay with the ratio of 1:2-1:4 bentonite:ballclay |
| Plant fibers | Extracted plant fibers with significant ability to withstand high tensile strength such as flax, sisal and hemp fibers. | 1-5% Vol. |
| Fibers with additional qualities | Extracted plant fibers with significant unique qualities such as thermal or acoustic insulation such as date wands. | 0-6% Vol. |
| Liquid | Water | 25-50% wt. |
| Natural source adhesives | Gluing/bonding substances from natural sources such as tannin, lignin, protein. | 0-10 wt. |
| Salt | High water soluble salts such as Magnesium chloride, calcium chloride, NaCL | 0-2%, 0-0.5% wt. |

It will be appreciated that the mixture can be mixed in any suitable machinery such as a continuous mixer that can be resulted in a homogenous blend of material. Dry material versus wetted material might have different mixing methods.

In some examples, the natural earth material needs to be granulated and or particulated. The particulating of the material can be obtained by pounding, crushing, grinding, shredding, slitting, dicing, crushing, crumbing, chopping by conventional size reduction processes, including, without being limited thereto, shredders, grinders, choppers, granulators, which, when necessary, may be equipped with blades, hammers or plates. Same or similar process can be applied to the plant fibers as well as or in combination with known processes to plant fiber treatments.

Further, prior to mixing, partial or full drying of the natural earth component of the mixture can take place. Drying may be achieved by any means, e.g. by simply allowing the matter to rest, placing the matter under a stream of dry air, in an oven chamber or by squeezing the liquid out, if applicable.

The disclosed subject matter further provides a process for preparing a final product comprising the steps of: (ia) providing a mixture as disclosed herein above and below; (ib) mixing the mixture components (ii) adding said mixture to a mold; (iii) processing the mixture in said mold; the processing comprises at least one of: (a) heating the mixture to a temperature of between 60 DC to about 140 DC (b) applying predetermined compression pressure and (c) extracting fluid from the mixture and (iv) drying a resultant article of manufacture whereby said final product is obtained; wherein said product is characterized by having a bending strength of between about 4 Mpa to about 7 Mpa.

In accordance with an example of the disclosed subject matter the process comprises the step of coating the article of manufacture after drying. In some embodiments, coating agents can be natural plant extract oil or natural plant extract adhesive. Said at least one plant extract oil is selected from the group consisting of drying oils (e.g. oil which can be chemically reacted or crossed linked by a source of oxygen. Examples of such oils are: walnut, tung, linseed oils and any mixtures thereof.) In accordance with another example, the coating agent can be a natural extract resin or resin-based mixture. In accordance with yet an example, the article can be coated using combination of coating agents as disclosed herein.

The process in accordance with a disclosed subject matter can be performed using a mold to provide for the desired shape of the article of manufacture.

The presently disclosed molding process for forming an article of manufacture comprises:

heating the mold of the presently disclosed subject matter as will be discussed hereinbelow to a desired temperature in the range between 50 and 140 DC (in some embodiments to 80 DC) and maintaining the mold in a temperature within said range for a predetermined time during the process;

placing, pouring or injecting a mixture of the presently disclosed subject matter to the inner space of the mold;

pressing together the mold parts of a mold to exert pressure over the mixture so as to impose a predetermine shape on the mixture with a load between 40 Bar to 120 Bar (in some embodiments 60 Bar), and maintaining such pressure during the process; and compressing the mixture to extract fluid therefrom and impart structural change to the particles within the mixture so as to obtain an article having bending strength of about 4 Mpa to about 7 Mpa; and opening the mold to release said article of manufacture.

In some embodiments of the process of the presently disclosed subject matter, the pressure exerted by the mold of the mixture during the process is gradually changed (either increased or decreased) at least along a predetermined time interval during the process. This is in order to customize the density of the article of manufacture formed during the process (due to various factors such as fluid loss or drying, and the structural change of clay particles present in the mixture of the disclosed subject matter with the other components of said mixture).

In some embodiments of the presently disclosed process, it further comprises a coating step of the article of manufacture formed by the process disclosed. Such coating components include, but are not limited to natural extract oils and natural extract resins.

Figure 3:
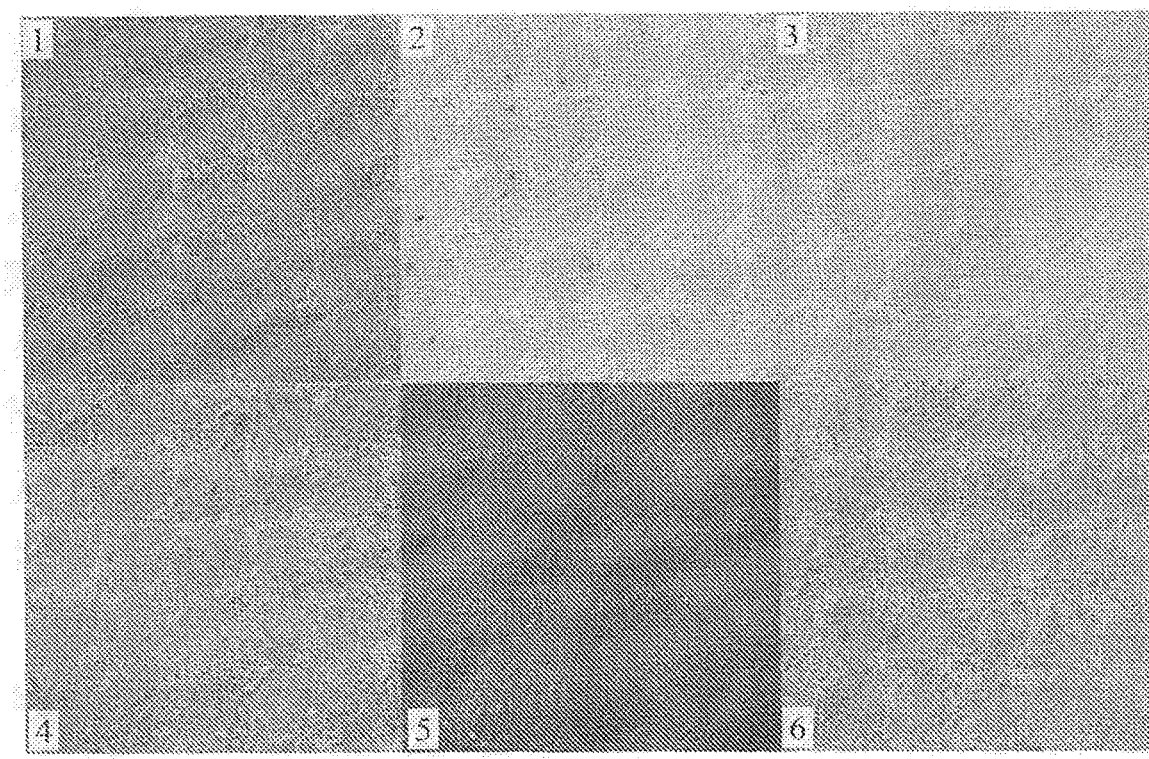
FIG. 3 illustrates a top view of tiles manufactured in accordance with examples of the disclosed subject matter.
Figure 4:
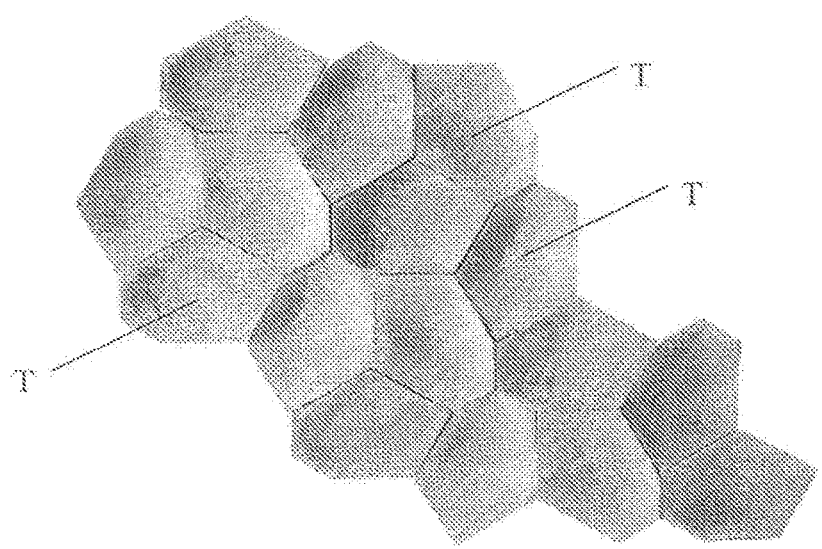
FIG. 4 illustrates a plurality of articles of manufacture, produced in accordance with the disclosed subject matter.

Article of manufacture and products formed therefrom that are the subject of the presently disclosed subject matter include, but are not limited to materials in the building and design industries as seen for example in FIGS. 3 and 4 illustrating tiles and building components in accordance with the disclosed subject matter. The articles can be configured for use as indoor and outdoor tiles, floor tiling, roof tiles, building blocks (e.g. masonry), light construction elements such as light shades, outdoor furniture, lining, indoor partitioning systems, furniture parts and any other type of articles having any desired shape and size. The mixture is not limited, however, to the aforementioned types of products, and can be used as a raw material for any desired product that can be produced therefrom, without departing from the scope of sought protection as defined by the claims. As seen in FIG. 4, a plurality of tiles T are arranged to produce a decorative wall covering. As seen in FIG. 3, the tiles can be of various colours and textures (six examples are presented in these figures however it will be appreciated that a large variety of colors and shades can be further manufactured, e.g. from natural earth mixtures or with color affected by organic color pigments) which are determined based on the mixture used for their manufacturing. It will be appreciated that the geometry of plant fibers will effect the outer appearance of the article of manufacture.

It is appreciated that while the presently disclosed subject matters motivate that after reaching their final life time, the articles can be fully or nearly fully reused (recycled) and alternatively will naturally degrade to their earth-nutrient components, the use of small amounts of unnatural gluing/bonding/cementing material in the presently disclosed earth mixtures in order to satisfy the demands of a local standard or due to other constraints or requirements, should not be considered a departure from the scope of the presently disclosed subject matters, as long as such use does not dramatically change the qualities achievable by the presently disclosed subject matters without the use of such unnatural material.

Process of Manufacturing an Article

In accordance with the disclosed subject matter there is further provided a process for forming articles characterized by having a structural bending strength. In accordance with the disclosed subject matter the bending strength is between about 4 Mpa to about 7 Mpa. In accordance with an example of the disclosed subject matter the bending strength is about 6 Mpa. It will be appreciated that the bending strength of the mixture varies along the stages of the process. The article of manufacture produced by any of the processes in accordance with the disclosed subject matter has a compressive strength of at least about 8 Mpa. In accordance with another example of the disclosed subject matter the compressive strength of the article of manufacture is at least about 20 Mba.

The process in accordance with one embodiment of the disclosed subject matter comprises:
  providing a mixture by mixing a first component comprising:
    at least one natural earth material selected from earth insoluble minerals, silt and sand or any combination thereof;
    at least one type of clay material;
    at least one type of plant fibers; and
    liquid;
  said mixture is characterized by having a liquid content of at least about 20% wt of the total weight of the fibrous mixture.
  processing the mixture, the processing comprises at least one of heating the mixture to a temperature of between 60 DC to about 140 DC under a predetermined compression pressure and drying the mixture whereby an article of manufacture is obtained.

A process of forming an article in accordance with another embodiment comprises:
  subjecting at least one natural earth material selected from earth insoluble minerals, silt and sand or any combinations thereof at least one type of clay material, and at least one type of plant fiber to at least one processing step selected from the group consisting of mixing, drying and/or heating, to obtain a first component;
  mixing the first component with a second component comprising a liquid, to obtain a mixture; and
  processing the mixture, the processing comprises at least one of heating the mixture to a temperature of between 60 DC to about 140 DC under compression pressures and drying the mixture whereby an article of manufacture is obtained.

Processing the mixture in accordance with an example of the disclosed subject matter comprises heating the mixture to a predetermined temperature of about 80 DC while applying compression pressure thereto. In accordance with an example of the disclosed subject matter, the compression pressure can be between about 40 Bar to about 100 Bar. It will be appreciated that the pressure can be applied gradually until reaching the compression pressure of between about 40 Bar to about 100 Bar. In accordance with an example, the compression pressure is about 60 Bar. Gradual application of the pressure will allow control over the distribution of the mixture to which the compression pressure is applied, allowing release of fluid therefrom and avoiding damage to the mixture. The fluid can comprise the liquid as added to the mixture and/or liquids released from the components forming the first component of the mixture. It will be appreciated that the compression pressure can be increased and/or decreased during the process as discussed. In accordance with an example the pressure can be increased or decreased depending on the change in volume of the total mixture. In accordance with some example, the amount of fluid released from the mixture is also monitored during the process. The amount of fluid released can be measured during the process and by comparing, e.g. the volume of liquid released from the mixture under compression (R) to the amount of liquid introduced to the mixture while mixing the same (I), where R≤I, compression pressure is maintained and increased between about 40 Bar to about 100 Bar. In accordance with an example, the pressure is increased to about 60 Bar.

It will be further appreciated that the compression pressure is applied over a predetermined period of time. While the application of compression pressure is commenced gradually, the pressure mixture is pressed under a constant pressure over a predetermined time period after reaching the predefined and required pressure, as discussed herein.

In accordance with an example, the constant compression pressure is applied over the mixture between about 5 min to about 30 min. In accordance with a specific example the compression pressure is applied between about 5 min to about 20 min. In accordance with yet an example, the pressure is applied between 5 min to about 10 min. In accordance with yet another example, the pressure is applied for about 8 min. While the pressure applied over the mixture can vary during the process it will be appreciated that the process of heating the mixture at a temperature of between about 60 DC to about 140 DC, or about 80 DC to about 100 DC, or 80 DC is continuous and is in parallel to the process of applying the compression pressure as discussed herein.

The process in accordance with an example of the disclosed subject matter further comprises drying the article of manufacture after releasing the compression pressure therefrom. The drying is performed in accordance with an example over a period of time at a temperature of between about 60 DC to about 100 DC, or about 70 DC to 90 DC, or about 80 DC. The drying is performed for at least 5 hours.

To protect the article and as discussed above, it can be further coated using coating agents such as drying oils, resins, plant extracts and the like. It will be appreciated that the coating can further enhance the bending strength of the article, resulting in article characterized by having a bending strength as discussed herein or even higher. The coating in accordance with an example of the disclosed subject matter is performed following the drying process and after allowing the article of manufacture to reach ambient temperature (e.g. 25 DC).

The mixture of the disclosed subject matter can be used in variety of industrial processes, to form a variety of semi-finished or finished articles of manufacture and products. Non-limiting examples include building material, panels, boards, pallets, pots, component of plant growth substrate, and many others. In accordance with some examples the expected applications can be prefabricated elements such as tiles (wall and floor), dividing panels, acoustic panels, bricks, light modular structures, outdoor prefabricated solutions such as public furniture, etc.

In some examples in accordance with the disclosed subject matter, the process comprises preparing an article comprising two or more materials adhered to one another to form laminates and the like, where at least one layer comprises the article formed from the mixture material as discussed with reference to the examples of the disclosed subject matter. Such multi-layer structures can be obtained by lamination, co-compression, overmolding so as to form the multi-layer product.

Figure 2A:
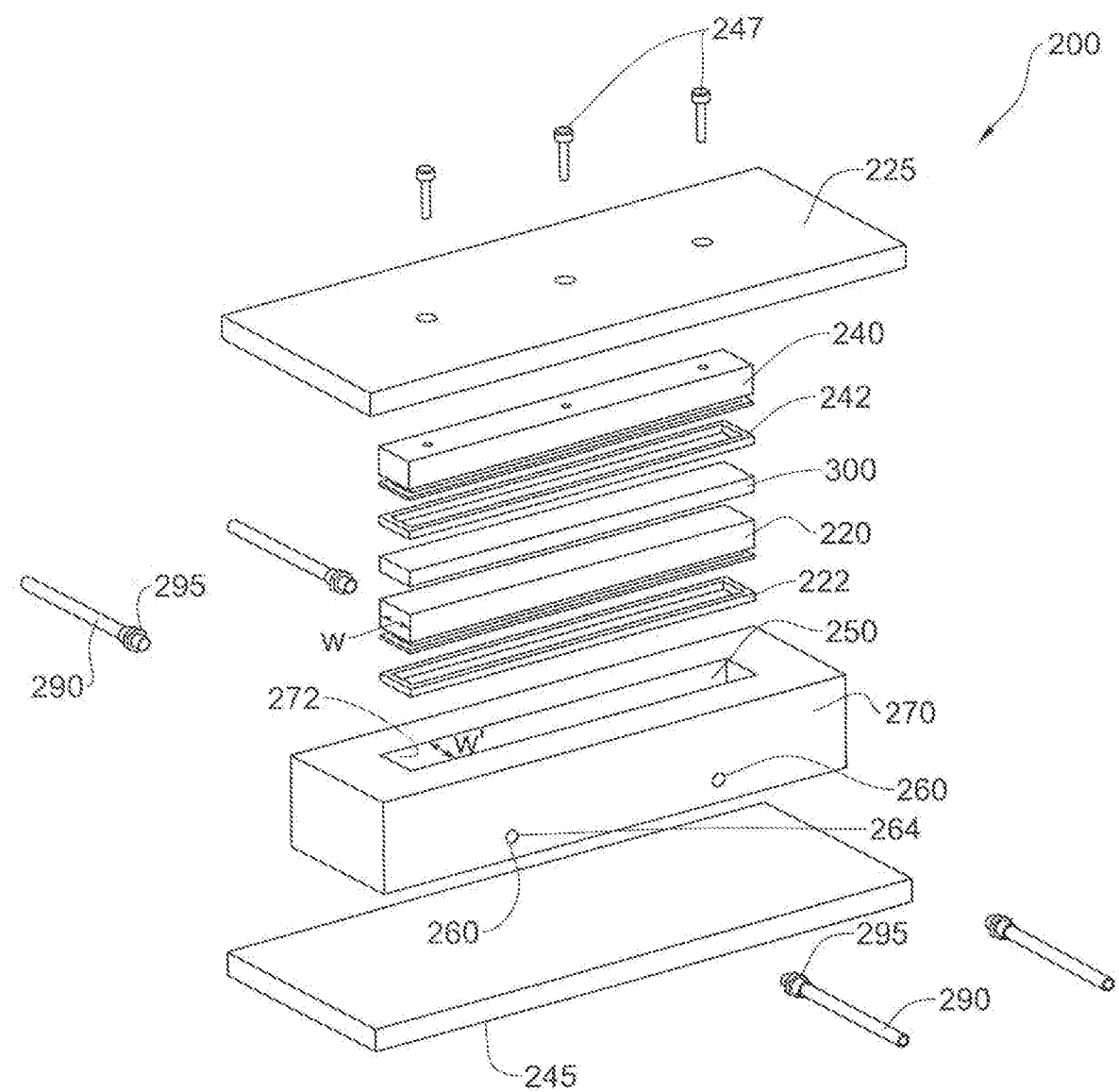
FIGS. 2A to 2C illustrate a mold in accordance with another example of the disclosed subject matter, where
Figure 2B:
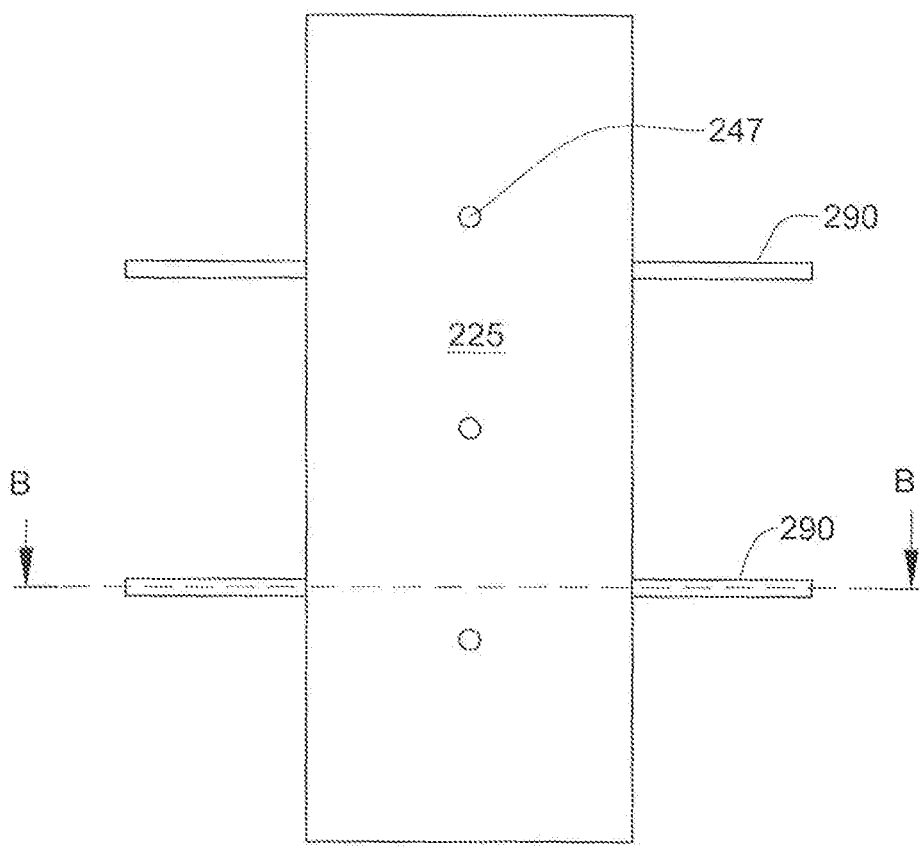
Figure 2C:
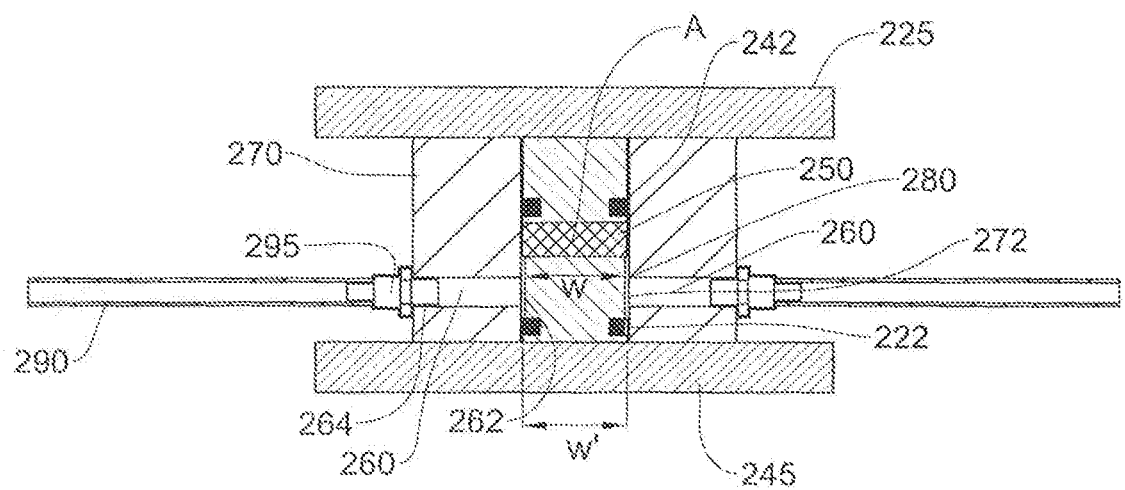

The disclosed subject matter further refers to a molding process for molding an article of manufacture. In accordance with one example the molding process comprises using a mold configured for compression molding which comprises a fluid sealable cavity configured for receiving and holding a mixture A in accordance with the disclosed subject matter and wherein at least a portion of the mold is being configured to apply compression pressure over the mixture received within the mold cavity 250. An example of the mold generally designated 200 in accordance with this embodiment is illustrated in FIGS. 2A to 2C. The mold is configured for molding a substantially planar, oblong article 300.

The mold 200 comprises a bottom mold portion 220 and a top mold portion 240 each configured for attachment to a bottom wall surface 245 and a top wall surface 225, respectively. In the illustrated example the mold portions are detachably attachable to the respective wall surfaces, the top mold portion in this example is attached using screw 247 like elements. To provide sealing at the attachment points the mold portions are provided with respective sealing ring 222 and 242. It will be appreciated that the respective mold portions 220 and 240 and the wall surfaces 225 and 245 can be integrally formed. The mold is further provided with a circumferential wall 270 which in this example is rectangular. The mold cavity 250 (seen in cross section in FIG. 2D) substantially corresponds to a shape of the article of manufacture 300 to be molded thereby. The mold is provided with a circumferentially extending fluid passageway 280 at least around one of the mold portions 220 and 240, and in this example is provided at least around the bottom mold portion 220. As best seen in FIG. 2D, the passageway 280 is configured by providing a bottom mold portion having width w narrower than the width constituted by the distance between the inner side 272 of the opposing walls of the circumferentially extending wall 270.

The mold further comprises at least one active fluid duct 260, in the illustrated example four fluid ducts 260 are provided, extending through the circumferentially extending wall 270 of the mold 200. Each fluid duct comprises an inlet port 262 (seen, e,g, in FIG. 2D) and an outlet port 264. The fluid duct 260 extends through the mold such that the inlet port is in fluid communication with the fluid sealable cavity and is configured for fluid extraction from the fluid sealable cavity when the mold is in operation.

In accordance with an example of the disclosed subject matter the fluid ducts 260 are associated with a vacuum generator (e.g. vacuum pump) (not shown) connectable through the tubes 290 configured for sealing articulation to the outlet port 264 of the duct through associated sealing member 295. This vacuum generator is configured to facilitate fluid extraction from the fluid sealable cavity via at least one fluid duct 260.

In accordance with an example of the disclosed subject matter at least one fluid duct can be provided with a filtering member extending along at least a portion thereof to filter liquid substances from the mixture while maintaining the non-liquid substances (not shown). In accordance with another example the filtering member is configured to allow passage of particles not exceeding the size of the vapor and\or water molecules from the mixture contained within the mold cavity. It will be appreciated that only a selected number of the fluid ducts can be associated with a vacuum pump, in which case the remaining ducts will be fluid sealed to maintain the sealability of the fluid sealed cavity 250.

It will be appreciated that one or more of the fluid ducts can be configured for introducing the mixture into the fluid sealable cavity. The mold 200 is further configured for compression molding, in which case the top wall surface will be actuated and pressed over the mixture contained within the cavity 250.

Figure 1B:
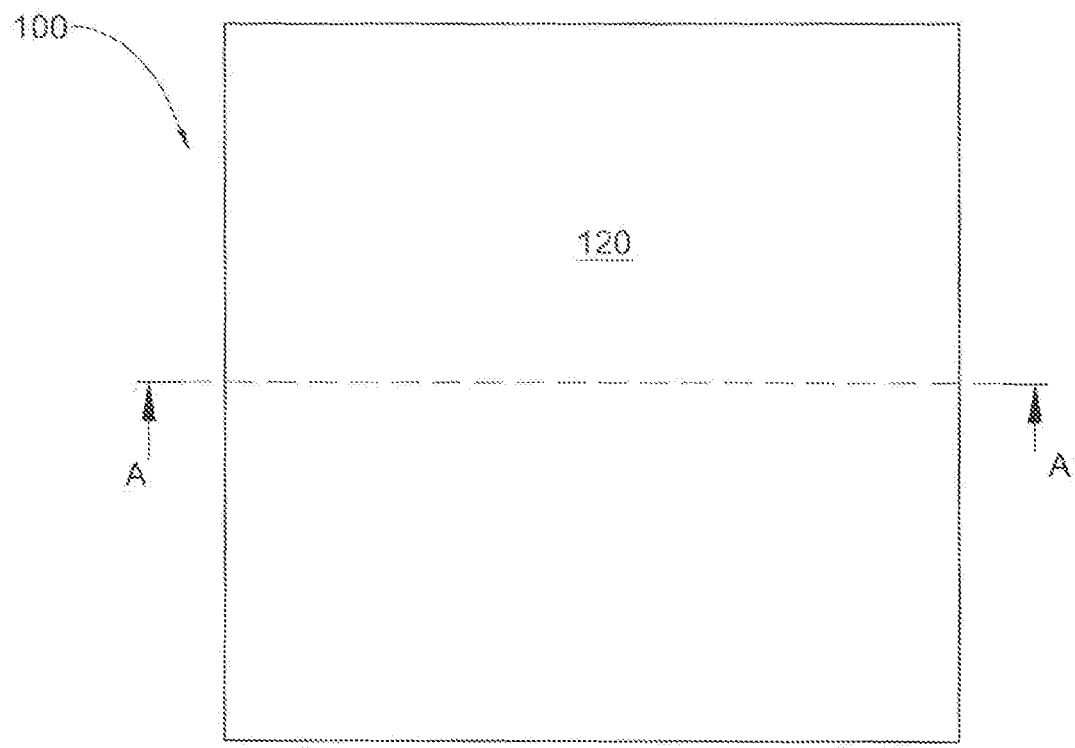
Figure 1C:
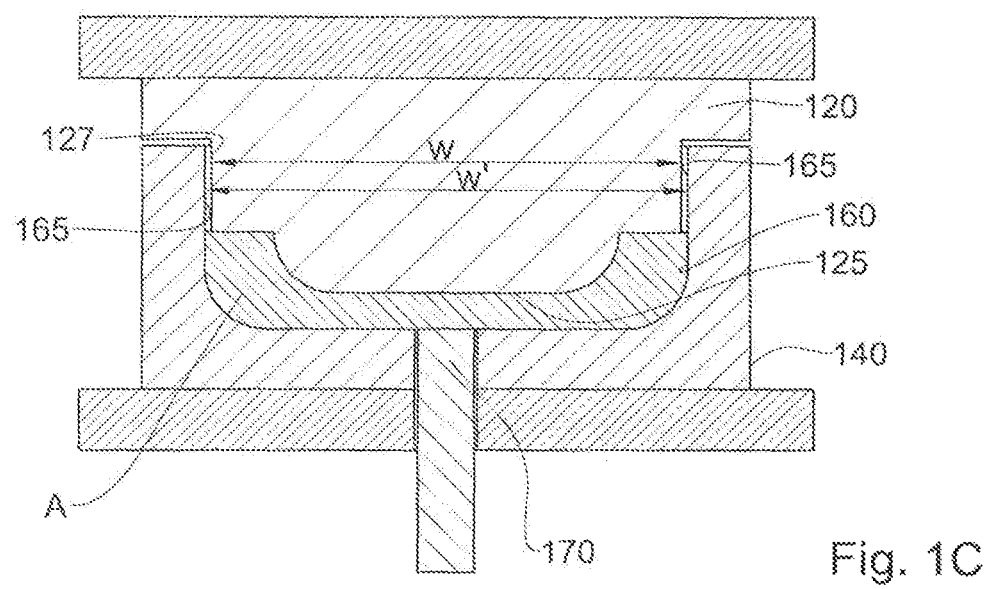

A mold generally designated 100 in accordance with another example of the disclosed subject matter is disclosed with reference to FIGS. 1A to 1C. FIG. 1A illustrates the mold 100, in an exploded view. The mold comprises a first part 140 and a second part 140 configured to overlappingly engage each other so as to define a cavity 160 configured for receiving and holding a molding mixture A. The mold 100 comprises at least one movable part, in the present example first part 120, which upon movement is configured to apply pressure over the charge mixture A received within the mold cavity 160. The first part 120 can be associated for example with a press member, configured for moving thereof and applying compression pressure over the mixture A as the pressing part 120 is moved towards the base part 140. As best seen in FIG. 1C the base part 140 is provided with a cavity configured to receive therein the charge mixture A and further a protruding member 125 of the movable part 120, such that the outer surface of the protruding member 125 substantially corresponds to the outer surface of the article to be produced. The mold parts overlap such that an interstice is formed therebetween, the interstice constituting a fluid passageway. As can be seen in FIG. 1A, the protruding member 125 overlaps with the inner walls of the base member 140 however the dimensions thereof are slightly smaller than the dimensions of the cavity within the base member (i.e. the width of the protrusion w is narrower than the distance w' between the opposite sidewalls of the base member 140, i.e. w<w'). Moreover, the protrusion is only partially encompassed by the bottom mold cavity so as to form the interstice at the circumference of the protrusion and the gap between the two mold parts, together constituting the passageway 165. Thus a fluid passageway 165 is formed and extends between the outer surface 127 of the protrusion 125 and the inner surface 165 of the cavity 160. This passageway 165 will allow exit of the fluid from the mold cavity during the process.

The cavity 160 is defined by the two mold parts 120 and 140, when in the closed configurations, substantially corresponds to the shape of the article to be molded, and as in this example, a curved article of manufacture. The cavity 160 is substantially sealable to prevent escape of the mixture therefrom during the molding process however, fluid is allowed to escape through the passageway 165 as indicated.

The mold further comprises a knock out pin 170 extending at the base part 120 which is actuated when the molding process is completed, and the article can be removed.

The molds 100 and 200 in accordance with the disclosed subject matter are configured for compression molding. The molds are further configured for heat transfer. The mold in accordance with the disclosed subject matter can be formed from any suitable material or a combination of materials suitable to withstand the compression pressures as discussed herein in connection with the molding processes and to conduct and maintain heat as further discussed herein.

The molding process comprises providing the mold in accordance with the disclosed subject matter. The mold is preheated to a temperature of about 60 DC to about 140 DC. The mixture in accordance with the disclosed subject matter is introduced to the fluid sealable cavity, and the process in accordance with the disclosed subject matter as discussed, is initiated. The mixture within the mold is processed by continuously heating the mold and consequently, the mixture is heated to a temperature of between 60 DC to 140 DC under compression pressure of between 40 Bar to about 100 Bar which is applied over at least a part of the mold. As discussed herein, in accordance with an embodiment of the disclosed subject matter the temperature is about 80 DC and the pressure applied to the mixture is about 60 Bar. The mixture is heated and compressed for at least 4 minutes. In accordance with an example the mixture is heated and compressed for about 8 minutes. During this process, fluid is allowed to escape from the mixture and in accordance with an example at least one vacuum pump is actuated, extracting the liquid released from the mixture into the cavity. While the vacuum pump is configured to extract the fluid and more specifically liquid from the mixture, it will be appreciated that any particles released from the mixture can be extracted along with the liquid.

Following the molding process, the article is released from the mold and is allowed to dry. In accordance with an example, the article is dried for at least 5 hours at a temperature of about 70-100 DC. In accordance with an example, the article is dried at about 80 DC for at least 6 hours.

DETAILED DESCRIPTION OF NON-LIMITING EXAMPLES

Example: Preparing a Product of the Disclosed Subject Matter as Seen, e.g. in FIGS. 3 and 4

A. Preparing a Mixture in Accordance with the Disclosed Subject Matter

1. Obtaining soil materials from a selected import zone, suitable for the products manufacture based on preliminary tests showing maximum particle size as needed.

2. Preparing the soils using particles separator and/or by grinding to obtain a predetermined particle size distribution and drying the particles.

3. Determining the particle size distribution of the materials and adding as required the amount of clay needed.

4. Preparing a mixture of all the dry particles (i.e. "particulate mixture") by homogenously mixing the same.

5. Cutting plant fibers to the desired size, e.g. based on strength and visibility considerations for the final article of manufacture and drying them before further use.

6. Adding the plant fibers into the "particulate mixture", mixing by shacks, until homogeneous (also referred to as "fibrous mixture") is achieved.

7. Calculating the amount of liquid needed for the mixture.

8. Preparing the liquid, if needed, dissolving salts in the liquid prior to adding it to the "fibrous mixture" to create the "total mixture".

9. Preheating the mold to the desired temperature.

10. Adding the liquid to the "fibrous mixture", mixing until homogeneous mixture can be achieved.

11. Pouring the "total mixture" into the mold.

B. Molding the Mixture of the Invention

12. Closing the mold on the mixture and pressure is applied gradually in constant speed, until the desired pressure is achieved, based on the properties needed and the mixture's viscosity.

13. Once the preset pressure threshold is reached, the timer for the process is activated.

14. During the mold compression, the pressure should be controlled so as to maintain constant pressure during the entire procedure. A vacuum is being applied alternately during compression to extract and collect any excess fluids from the mold.

15. Once the compression time is over, the pressure is being unloaded and the extraction of the sample from the mold is made.

16. The final product is dried.

17. Cooling the product.

18. Applying a proper coating in at least one layer to receive the final product.

The invention claimed is:

1. A process for preparing a product, comprising the steps of:
    i) providing a fibrous mixture comprising:
        (a) at least one dry natural earth material selected from insoluble earth minerals, silt, sand, and any combination thereof,
        (b) at least one clay material,
        (c) at least one plant fiber material, and
        (d) a liquid present in an amount of at least about 20 wt % based on the weight of the fibrous mixture;
    ii) adding said fibrous mixture to a mold;
    iii) processing the fibrous mixture in said mold, the processing comprises:
        (a) heating, within the mold, the mixture to a temperature of between 60° C. to about 140° C., and
        (b) applying a predetermined compression pressure to the fibrous mixture within the mold; and
    iv) drying said fibrous mixture whereby said product is obtained,
        wherein said product has a bending strength of from about 4 MPa to about 7 MPa.

2. The process in accordance with claim 1, wherein the compression pressure is from about 40 bar to about 120 bar.

3. The process in accordance with claim 2, wherein the compression pressure is applied continuously.

4. The process in accordance with claim 1, wherein a compressive strength of the product is at least about 20 MPa.

5. The process in accordance with claim 1, wherein the compression pressure is applied over the fibrous mixture for a period of time of from about 5 min. to about 30 min.

6. The process in accordance with claim 1, wherein drying comprises drying the product over a period of time at a temperature of from about 60° C. to about 100° C.

7. A molding process for molding an article of manufacture, comprising:
  i) providing a mold comprising
     a fluid sealable cavity configured for receiving and holding a fibrous mixture and substantially corresponding to a shape of the article of manufacture to be molded thereby, and
     at least one fluid duct comprising an inlet port and an outlet port, wherein at least the inlet port is in fluid communication with the fluid sealable cavity and at least one of the at least one fluid duct is configured for fluid extraction from the fluid sealable cavity;
  ii) providing a fibrous mixture comprising:
     (a) at least one dry natural earth material selected from insoluble earth minerals, silt, sand, and any combination thereof,
     (b) at least one clay material,
     (c) at least one plant fiber material, and
     (d) a liquid present in an amount of at least about 20 wt % based of the weight of the fibrous mixture;
  iii) introducing the fibrous mixture to the mold;
  iv) processing the mixture within the mold, the processing comprising heating, within the mold, the mixture to a temperature of between 60° C. to 140° C. under compression pressure of from 40 bar to about 120 bar applied over at least a part of the mold; and
  v) drying the fibrous mixture, whereby said article of manufacture is obtained, and whereby the article of manufacture has a bending strength between about 4 MPa to about 7 MPa.

8. The molding process in accordance with claim 7, wherein the process further comprises the step of applying vacuum to the fibrous mixture comprised within the mold to extract fluid therefrom.

9. The molding process in accordance with claim 7, wherein at least a portion of the mold is preheated to a temperature of between about 60° to about 140° C. prior to introducing the fibrous mixture thereto.

10. The molding process in accordance with claim 7, wherein the mold further comprises a fluid sealable circumferential passageway configured to allow release of a fluid from the fibrous mixture prior to sealing thereof.

11. The molding process in accordance with claim 7, wherein the step of processing the mixture is applied for a period of time of from at least over 5 min. and up to 30 min. at a predetermined temperature.

12. The process in accordance with claim 2, wherein the compression pressure is applied non-continuously.

13. The process in accordance with claim 1, wherein said processing the fibrous mixture in said mold comprises heating the fibrous mixture while applying the compression pressure thereto.

\* \* \* \* \*